US012729817B2

(12) # United States Patent
Albassam

(10) Patent No.: US 12,729,817 B2
(45) Date of Patent: Sep. 8, 2026

(54) SYSTEM AND METHOD FOR OPTIMIZING PIPELINE NETWORK PERFORMANCE

(71) Applicant: SAUDI ARABIAN OIL COMPANY, Dhahran (SA)

(72) Inventor: Abdulaziz K. Albassam, Tanajib (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 476 days.

(21) Appl. No.: 18/339,079

(22) Filed: Jun. 21, 2023

(65) Prior Publication Data

US 2024/0426433 A1 Dec. 26, 2024

(51) Int. Cl.
*F17D 5/00* (2006.01)
*F17D 5/06* (2006.01)

(52) U.S. Cl.
CPC .................................... *F17D 5/00* (2013.01); *F17D 5/06* (2013.01)

(58) Field of Classification Search
CPC ............... F17D 5/00; F17D 5/06; E21B 43/00
See application file for complete search history.

(56) References Cited

U.S. PATENT DOCUMENTS

| | | | | |
|---|---|---|---|---|
| 5,436,874 A | | 7/1995 | Kuhn et al. | |
| 2003/0084707 A1 | * | 5/2003 | Gysling | G01N 9/002 73/32 R |
| 2008/0163700 A1 | * | 7/2008 | Huang | G01B 17/025 73/861.25 |
| 2008/0204008 A1 | * | 8/2008 | Paulson | F16L 55/46 324/220 |
| 2011/0037598 A1 | * | 2/2011 | Day | G01F 1/74 340/606 |
| 2011/0040501 A1 | * | 2/2011 | Martin | E21B 47/10 702/45 |
| 2017/0003200 A1 | * | 1/2017 | McDowell | G01M 3/2815 |
| 2018/0292539 A1 | | 10/2018 | Chang et al. | |
| 2020/0102961 A1 | * | 4/2020 | Fowler | F04D 13/06 |
| 2023/0003122 A1 | * | 1/2023 | Li | G01N 33/2823 |
| 2024/0035628 A1 | * | 2/2024 | Reid | G01F 1/74 |

FOREIGN PATENT DOCUMENTS

| | | | | | |
|---|---|---|---|---|---|
| CN | 1207777 | A | * | 2/1999 | C22B 3/16 |
| CN | 108871464 | A | * | 11/2018 | G01D 21/02 |
| CN | 111947039 | A | * | 11/2020 | H04L 67/025 |
| CN | 112930019 | A | * | 6/2021 | H05H 7/04 |
| GB | 2492802 | A | * | 1/2013 | E21B 47/135 |
| JP | 3583980 | B2 | | 11/2004 | |
| WO | WO-2013072685 | A2 | * | 5/2013 | G01F 17/00 |

OTHER PUBLICATIONS

Datta et al, A review on different pipeline fault detection methods, Mar. 15, 2016, Journal of Loss Prevention in the Process Industries, pp. 97-106. (Year: 2016).*

* cited by examiner

*Primary Examiner* — Mark A Connolly
(74) *Attorney, Agent, or Firm* — Vorys, Sater, Seymour and Pease LLP

(57) ABSTRACT

Examples are disclosed herein relating to pipeline network performance optimization. In an example, acoustic wave data representative of one or more propagated acoustic waves through a fluid in a pipeline network can be received. The acoustic wave data can be evaluated to determine whether a density change has occurred in the fluid. Density change data can be outputted in response to detecting the density change in the fluid.

14 Claims, 9 Drawing Sheets

500

| Characteristics | High Density Fluid | Low Density Fluid |
|---|---|---|
| Speed | Fast | Slow |
| Frequency | High | Low |
| Wavelength | Short | Long |
| Amplitude | High | Low |
| Cycle (Period) | Short | Long |
| Travel Time | Short | Long |

FIG. 5

SYSTEM AND METHOD FOR OPTIMIZING PIPELINE NETWORK PERFORMANCE

FIELD OF THE DISCLOSURE

This disclosure relates generally to pipeline network condition monitoring, and more particularly, to techniques for optimizing a pipeline network performance.

BACKGROUND OF THE DISCLOSURE

Upstream production in a hydrocarbon industry refers to the exploration, drilling, and production of crude oil and natural gas resources from underground reservoirs. Once these resources are extracted, they need to be transported to downstream processing facilities where they can be refined, processed, and distributed to consumers, retailers or other facilities. To transport these resources, a network of pipelines is used to connect the upstream production facilities to the downstream processing facilities. These pipelines are typically made of steel and are designed to transport oil and gas over long distances in high pressure and high temperature states. The transportation of oil and gas through pipelines involves several processes, including gathering, transmission, and distribution. The gathering process involves the collection of crude oil and natural gas from the wells and the initial processing of these resources. The transmission process involves the transportation of these resources through pipelines over long distances. The distribution process involves the delivery of these resources to refineries and processing facilities.

SUMMARY OF THE DISCLOSURE

Various details of the present disclosure are hereinafter summarized to provide a basic understanding. This summary is not an extensive overview of the disclosure and is neither intended to identify certain elements of the disclosure nor to delineate the scope thereof. Rather, the primary purpose of this summary is to present some concepts of the disclosure in a simplified form prior to the more detailed description that is presented hereinafter.

According to an embodiment, a computer implemented can include receiving, the processor, acoustic wave data representative of one or more propagated acoustic waves through a fluid in a hydrocarbon pipeline network, evaluating, by the processor, the acoustic wave data to determine whether a density change has occurred in the fluid, and outputting, by the processor, density change data in response to detecting the density change in the fluid.

In another embodiment, a system can include an acoustic monitoring system that can be configured to propagate an acoustic wave through a fluid in a pipeline network and provide acoustic wave data characterizing the propagated acoustic wave. The system can further include an acoustic surveillance system that can include an acoustic wave analyzer that can be configured to evaluate the acoustic wave data to determine whether a density change has occurred in the fluid, and output density change data in response to detecting the density change in the fluid.

In yet another embodiment, a computer implemented method can include receiving, by a processor, acoustic wave data representative of one or more propagated acoustic waves through a fluid in a hydrocarbon pipeline network, evaluating, by the processor, the acoustic wave data to determine whether a production performance of a producing well has decreased, and outputting, by the processor, acoustic wave data in response to detecting a decline in well performance.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 5 is an example of a table of acoustic wave responses in different density mediums.

DETAILED DESCRIPTION

Figure 1:
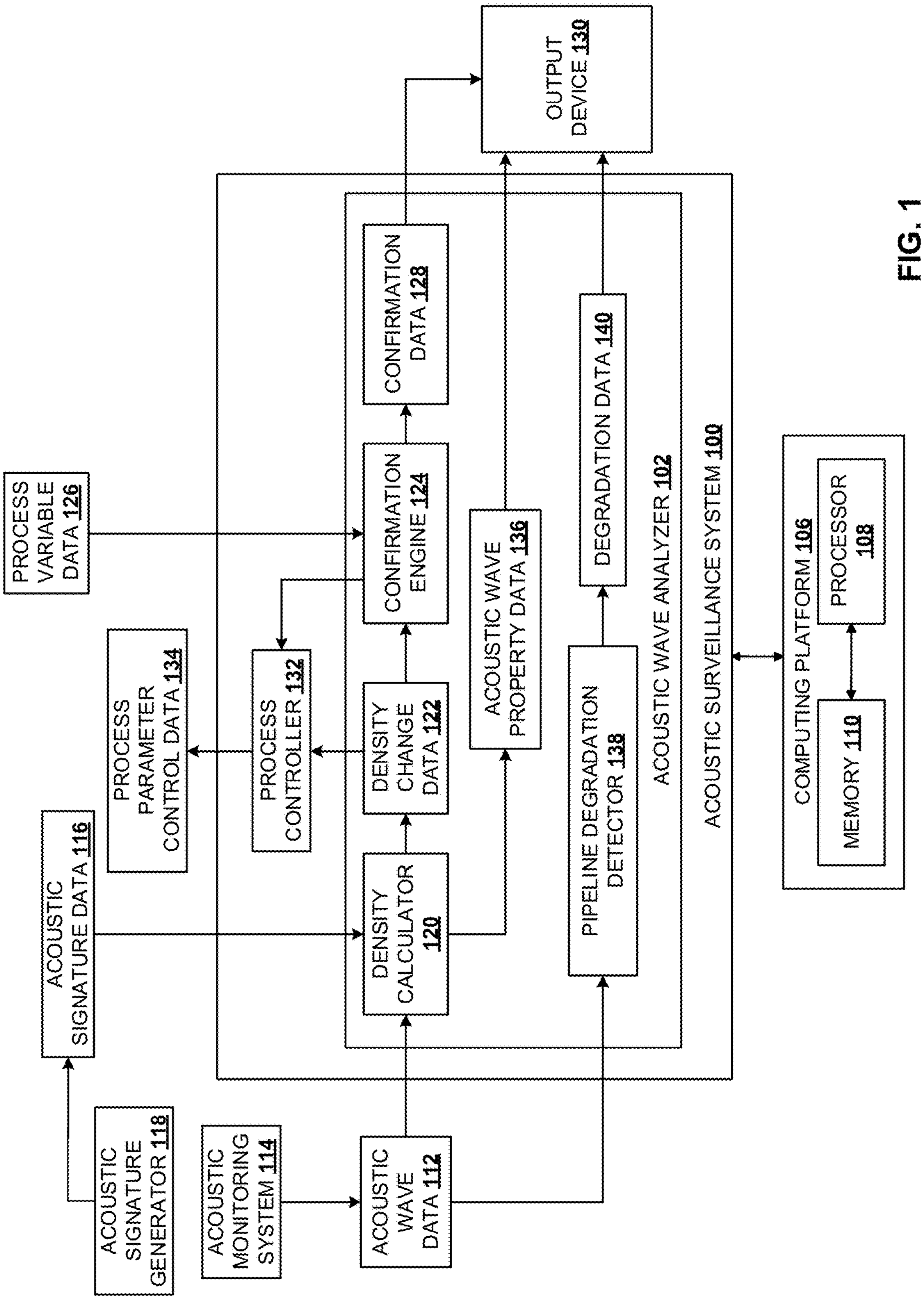
FIG. 1 is a block diagram of an example of an acoustic surveillance system.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments of the present disclosure relate to techniques for optimizing pipeline network performance. Hydrocarbons (e.g., oil and gas), are transported in a hydrocarbon industry over pipelines, which can include a production pipeline network, including upstream and downstream networks. Generally, fluids (e.g., oil, water and gas) are transported (flow) together through the pipeline networks and can be referred to as a multiphase fluid. The term "multiphase fluid" as used herein can refer to a combination of different substances, which can include constituents or components (e.g., phases) of liquids and/or gases. For simplicity, the multiphase fluid can include oil, water, and gas; however, other component combinations are within the scope of the present disclosure. Examples are presented herein in which a multiphase fluid is flowing through the pipeline, but in other examples, a liquid only can flow (e.g., oil, water, etc.).

Surveillance techniques are being used to monitor the flow of the multiphase fluid in pipeline networks to ensure that it is flowing at an optimal rate (e.g., to maximize production, minimize hazardous conditions, such as blockage, leaks, or other issues that could impact a safety and integrity of a pipeline and thus the pipeline network). Because the multiphase fluid is composed of multiple components, for example, an oil component, a water component, and a gas component, any of these components can affect a flowrate of the multiphase fluid. Properties of each of these components can impact the flowrate of the mixture as well—for example, density. Process parameters can affect the flowrate of the multiphase fluid, as well as its components. Temperature and pressure can affect the flowrate of the multiphase fluid in the pipeline network. For example, temperature affects the viscosity of the fluid, and pressure affects the density of the fluid as well as the fluid dynamics. Both of these properties can affect the flowrate of the fluid. For example, if the temperature is too low, the viscosity of the fluid may increase, leading to reduced flowrates. Similarly, if the pressure is too high, the density of the fluid may increase, which can also lead to reduced flowrates. Thus, process parameters can affect a flowrate of each of the components of the multiphase fluid, and consequently the flowrate of the multiphase fluid.

Pipeline network performance is monitored (surveilled) to ensure that the multiphase fluid is flowing at the optimal rate. A number of factors can affect the pipeline network performance and cause it to deviate from an optimal state (e.g., at which a fluid flows at an optimal flowrate), and these factors can be referred to as the process parameters because these physical conditions change the pipeline network performance. Other factors can change the pipeline network performance, such as leaks or ruptures in a pipeline (of the pipeline network). A change in any of the process parameters at a respective segment of the pipeline network (e.g., at a given pipeline) can affect the pipeline network performance, and thus affect an efficiency of the pipeline network, and/or undermine pipeline safety. Monitoring systems are being used to monitor pipeline network performance through evaluation and/or analysis of the processing parameters. Existing monitoring systems evaluate changes in pressure, temperature and and/or flowrate of the multiphase fluid to determine whether there has been a change in the pipeline network performance. In some existing approaches, multiphase flow monitoring (or metering) can be used to determine fluid flow rates in the pipeline network. Such systems act as surveillance for the pipeline network ensuring that the pipeline network is operating at an acceptable state.

Examples are disclosed herein that provide an additional layer to pipeline network surveillance through use of acoustics. According to the examples herein, density changes of a fluid (e.g., single or multiphase) can be detected in a pipeline using acoustic waves. For example, an acoustic wave generated at a source can be propagated through a single or multiphase fluid in a pipeline network and captured (in real-time) to provide acoustic wave data. The acoustic wave data can be analyzed according to the examples disclosed herein to allow for further analysis of network flowrate performance. For example, the acoustic wave data can be processed to identify and detect abnormalities of heavier or lighter liquids or gases introduced into a mixture baseline reference. In some examples, as disclosed herein, the acoustic wave data can be processed to detect potential pipeline corrosion and/or erosion (e.g., through detecting abnormal acoustic signatures). In additional or alternative examples, the acoustic wave data can be evaluated to detect water production or free gas production. In some examples, one or more systems of the present disclosure can be integrated into a process facilities network surveillance methodology (or system). Integrating the one or more systems, as disclosed herein, into facilities network surveillance expands or enhances a pipeline surveillance spectrum.

One or more examples are disclosed herein for monitoring and detecting a change in fluid density. For example, a pipeline network used in a hydrocarbon environment can be equipped with an acoustic monitoring system that includes an acoustic wave generator and an acoustic wave sensor. The acoustic monitoring system can be used to capture propagation responses of one or more acoustic waves traveling (propagating) through a fluid in the pipeline, in some instances, with increasing density due to water production or decreasing density due to increased free gas production. A (travel) speed of sound waves can be directly proportional to a density of a medium that a sound wave is traveling through. Using sound characteristics, an acoustic surveillance system, as disclosed herein, can be used to detect or determine that there has been a fluid density change in the fluid in the pipeline.

In some examples, the acoustic surveillance system can be used as a diagnostic tool for determining properties of matter (e.g., one or more fluids in the pipeline) using acoustic characteristics of the matter. Equipping the pipeline (or pipeline network) with the acoustic monitoring system allows for real-time detection and analysis of acoustic waves characteristics by the acoustic surveillance system, which allows for additional pipeline network performance optimization. In some examples, the acoustic surveillance system includes the acoustic monitoring system. In some examples, the acoustic surveillance system can be used as part of a process facilities network surveillance. Integrating the acoustic surveillance system into pipeline network surveillance expands or enhances existing pipeline network monitoring systems. The acoustic surveillance system can provide sound signature information, which can be used for flowrate process optimization. Thus, the acoustic surveillance system can provide an additional dimension to pipeline network surveillance (e.g., beyond temperature, pressure, and flowrate monitoring).

Examples are presented herein in which acoustic pipeline surveillance is described with respect to a segment of a pipeline network, for example, a pipeline. However, it is to be understood that the acoustic surveillance techniques, including systems, methods, and/or apparatuses, as disclosed herein, can be used at a number of different pipeline segments/portions in the pipeline network, for example, beginning at a production source to a processing facility. Furthermore, while examples are presented herein in which the pipeline is equipped with acoustic surveillance, in other or additional examples, inlets and/or outlets (at a processing facility) can be equipped as well with acoustic pipeline surveillance.

FIG. 1 is a block diagram of an example of an acoustic surveillance system 100 for monitoring a pipeline network in a hydrocarbon industry. The pipeline network can include one or more pipelines, facilities, etc. The acoustic surveillance system 100 can be used to detect fluid density changes in a fluid flowing through the pipeline network for optimizing (or ensuring) pipeline network performance. In some examples, the detected density change can be used to identify a source or cause of the density change in the fluid.

Thus, in some instances, the system 100 can be used for tracing back to flowrate source (e.g., back to the oil/gas producing wells). The flowrate source can be adjusted accordingly. The acoustic surveillance system 100 can include an acoustic wave analyzer 102 and a process controller 104. In some examples, one or more aspects of the acoustic surveillance system 100 can be implemented (e.g., as machine readable instructions) on a computing platform 106. The computing platform 106 can include one or more computing devices selected from, for example, a desktop computer, a server, a controller, a blade, a mobile phone, a tablet, a laptop, a personal digital assistant (PDA), and the like. The computing platform 106 can include a processor 108 and a memory 110. By way of example, the memory 110 can be implemented, for example, as a non-transitory computer storage medium, such as volatile memory (e.g., random access memory), non-volatile memory (e.g., a hard disk drive, a solid-state drive, a flash memory, or the like), or a combination thereof. The processor 108 can be implemented, for example, as one or more processor cores.

The memory 110 can store machine-readable instructions (e.g., which can include the acoustic wave analyzer 102 and/or the process controller 104) that can be retrieved and executed by the processor 108. Each of the processor 108 and the memory 110 can be implemented on a similar or a different computing platform. The computing platform 106 can be implemented in a cloud computing environment (for example, as disclosed herein) and thus on a cloud infrastructure. In such a situation, features of the computing platform 106 can be representative of a single instance of hardware or multiple instances of hardware executing across the multiple of instances (e.g., distributed) of hardware (e.g., computers, routers, memory, processors, or a combination thereof). Alternatively, the computing platform 106 can be implemented on a single dedicated server or workstation.

The acoustic wave analyzer 102 can identify changes in fluid density of the fluid in the pipeline (or the pipeline network). Examples are disclosed herein in which the fluid is a multiphase fluid, but in other examples, the fluid can be a single phase fluid. Thus, in some examples, the acoustic wave analyzer 102 can detect density changes in a single phase fluid. For example, the acoustic wave analyzer 102 can receive acoustic wave data 112, which can be provided by an acoustic monitoring system 114 positioned with respect to a pipeline of the pipeline network. The acoustic wave data 112 can characterize one or more acoustic waves that have been propagated through the fluid, which can be referred to as a propagated acoustic wave. The acoustic wave data 112 can electronically represent the one or more acoustic waves as signals (e.g., digital and/or analog signals). In some examples, the acoustic wave analyzer 102 can receive travel time data indicative of an amount of time between transmission of an acoustic wave and the acoustic wave being captured (as the propagated acoustic wave). The travel time data can be provided as part of the acoustic wave data 112, in some instances. In some examples, the acoustic wave analyzer 102 can evaluate the propagated acoustic wave to determine (or identify) an acoustic signature of the propagated acoustic wave based on the acoustic wave data 112, which can be referred to as a detected acoustic signature.

In some examples, the acoustic wave analyzer 102 can evaluate the acoustic propagated wave based on acoustic signature data 116. The acoustic signature data 116 can characterize an acoustic signature for the fluid at baseline, and thus can be referred to as a baseline acoustic signature. In some examples, an acoustic signature generator 118 can be used to provide the acoustic signature data 116. In some examples, the acoustic surveillance system 100 includes the acoustic signature generator 118. For example, samples of each phase fluid (e.g., oil, water, and gas) can be used and a sound wave can be propagated through each of these samples (individually) at different frequencies (e.g., to cover a wide frequency, temperature, density and other parameter range). The propagated sound wave through each of the samples can be captured and used to provide a baseline acoustic signature for each sample.

In some examples, samples of each of the phases can be captured at different temperatures and pressures for establishing a range of acoustic signatures for each phase. Each acoustic signature for each phase fluid (e.g., over a range) can have a combination of attributes or properties that are unique. The one or more properties can include, for example, an amplitude, a frequency, a wavelength, and a wave cycle (period), and/or a speed. An acoustic signature can include (or be represented by) information characterizing one or more properties of a sound wave. In some examples, the one or more properties can include property ranges for a corresponding phase. For example, oil can have a unique amplitude and frequency range combination.

The acoustic signature generator 118 can receive acoustic signature component (or phase) data for each phase fluid characterizing one or more acoustic signatures of each phase. The acoustic signature generator 118 can process the acoustic signature component data for each phase fluid to provide or create a baseline acoustic signature for the fluid. In examples in which the fluid is multiphase, the acoustic signature generator 118 can provide a composite acoustic signature, which can be referred to as the baseline acoustic signature, in some instances. For example, the acoustic signature generator 118 can combine the one or more acoustic signatures for each phase fluid to create a multiphase acoustic signature, which can be provided as the acoustic signature data 116.

The acoustic wave analyzer 102 can include a density calculator 120 that can evaluate the acoustic wave data 112 to detect (a density change in the fluid (or the multiphase fluid). In some examples, acoustic detectors/sensors (or devices) used herein can be calibrated. For example, the device can be calibrated before first utilization and baselined against water of Specific Gravity value of 1 to resemble liquids baseline. For gas baseline, the calibration will be made against dry air, nitrogen, helium or argon; depending on the expected gaseous components of the application. The density calculator 120 can output density change data 122 indicating a density change in the fluid. In some examples, the density change data 122 can indicate an amount of density change in the fluid. For example, the density calculator 120 can evaluate the acoustic signature data 116 relative to the acoustic wave data 112 to determine an amount that the density of the fluid changes.

In some examples, the density calculator 120 can extract or determine an acoustic signature of the propagated acoustic wave and compare the determined acoustic signature to the baseline acoustic signature. The baseline acoustic signature can be determined by the density calculator 120 using the acoustic signature data 116. In other examples, the baseline acoustic signature can be provided as or part of the acoustic signature data 116. The acoustic wave analyzer 102 can determine an internal fluid mixture density variation of the fluid with respect to time. The acoustic wave analyzer 102 can provide data characterizing the density change (variation) of the fluid over time, in some instances, as the density change data 122. In some examples, the acoustic wave analyzer 102 can provide the data indicating whether the density of the fluid has increased or decreased. In some examples, the density change data 122 can be rendered on an output device 130, as shown in FIG. 1. A user (e.g., a pipeline operator, for example, engineer) can use the density change data 122 for ensuring or optimizing pipeline network performance.

In some examples, a pressure and/or a temperature can change within the pipeline, which can impact the pipeline network performance. Changes in pressure and/or temperature can affect or change a density of a fluid flowing within the pipeline, and thus components of the multiphase fluid. When the temperature or pressure of the multiphase fluid changes, a corresponding volumetric flowrate of the fluid can also change, and can indicate a change in its density. In general, an increase in temperature or a decrease in pressure can cause a fluid to expand, resulting in a decrease in density. Conversely, a decrease in temperature or an increase in pressure can cause the fluid to contract, resulting in an increase in density. This can be factored in by the acoustic wave analyzer 102 using pressure and temperature data for the pipeline to determine whether the acoustic signature changes were induced by density fluctuations due to the source (of the fluid) or due to pressure and/or temperature fluctuations. The density of a fluid can affect its flow behavior. For example, in a multiphase fluid, each component has its own density. For example, if the density of an oil component in the multiphase fluid increases, it can cause a change in the overall density of a mixture (the multiphase fluid), which can affect the flowrate of the fluid. The change in flowrate can be due to changes in pressure drop or frictional forces between the fluid and the pipe wall, which can affect the resistance to flow.

In some examples, the acoustic surveillance system 100 includes a confirmation engine 124 that can be used to validate (or confirm/concur) that there has been a change in density of the fluid (e.g., the multiphase fluid) due to a change in a source (the source being a change in a given phase of the multiphase fluid), or due to a change (variation) in pressure and/or temperature with respect to the pipeline network. In some examples, the confirmation engine 124 can determine that the change is due to the source in response to determining that the change is not due to pressure and/or temperature of the pipeline network.

The confirmation engine 124 can use measured temperature and pressure information/data of the pipeline network (e.g., at a point in the pipeline network at which the change in density was determined). For example, the confirmation engine 124 can determine whether a correlation exists between the change in density of the fluid and the temperature and/or pressure, and the acoustic signature logged. As an example, the confirmation engine 124 can determine whether the change in density of the fluid occurred as a result (or because of) a variation (or change) in temperature and/or pressure of the pipeline network. The confirmation engine 124 can determine whether a correlation exists between a change in temperature and/or pressure of the pipeline network and a logged acoustic signature logged (which can be provided by the density calculator 120, or in other instances, determined by the confirmation engine 124 based on the acoustic wave data 112).

In some examples, the confirmation engine 124 can receive the density change data 122 and process variable data 126. The process variable data 126 can include measurements (or recordings) of a pressure, a temperature, flowrate of each fluid phase (or the multiphase fluid), and, in some instances, the acoustic wave data 112 for the pipeline network. For example, a pressure sensor can be positioned with respect to the pipeline and used to measure a pressure within the pipeline. The pressure can be measured to ensure safe operation conditions (e.g., so that the pressure does not exceed a maximum safe operating limit). A temperature sensor can be positioned with respect to the pipeline and used to measure a temperature within the pipeline. A flowrate device (or sensor) can be used to measure a flowrate of each fluid phase of the fluid. If the density of one or more fluid phases in the multiphase fluid changes, this can affect the pressure, temperature, flowrate of other fluid phases (or the multiphase fluid), and the acoustic wave data 112 for the pipeline.

In some examples, the confirmation engine 124 can process the density change data 122 and the process variable data 126 to determine whether a correlation exists between the change in density of the fluid and the temperature, pressure, and/or flowrate of other fluid phases in the pipeline. For example, the confirmation engine 124 can evaluate the temperature, the pressure, and/or the flowrate to determine whether any of these process variables have deviated outside an acceptable process variable range or exceeded a process variable threshold. The process variable range can define a range of values that have been indicated as permitted for a given process variable. The process variable threshold can indicate an upper limit (or maximum) for the given process variable (e.g., a not to exceed value for the given process variable).

The confirmation engine 124 can evaluate the density change data 122, in some instances, in response to determining that the given process variable (a value) is outside the process variable range, or exceeds the process variable threshold. The confirmation engine 124 can evaluate the density change data 122 to determine whether the change in density of the fluid has deviated outside of an acceptable density change range or density change threshold. There can be a respective density change range or threshold for each fluid phase (or the multiphase fluid). The density change range can define a range of density change values that have been indicated as permitted for the fluid. The density change threshold can indicate an upper limit (or maximum) density change for the fluid (e.g., a not to exceed density change for the fluid). These extremities (e.g., thresholds and/or value ranges) can be obtained from the baseline data during the calibration, and/or the reference flowback data collected while the rig is on location.

The confirmation engine 124 can determine that the correlation exists between the change in density of the fluid and the temperature, the pressure, the flowrate of the other fluid phases, and/or the acoustic wave data. The correlation can be representative of a confirmation of the density change of the fluid (e.g., the multiphase fluid). The confirmation engine 124 can output confirmation data 128 indicating that there has been a change in density of the fluid phase and that this change in density is supported (e.g., correlated with) by detected changes in the pressure, temperature, flowrate, and/or acoustic wave data (of the multiphase or other fluid phases) For example, a change in density of the fluid can change a density of one or more other fluid phases, which can affect the flowrate of the other fluid phases. The confirmation data 128 can be rendered on output device 130 (e.g., a display, a portable device, a tablet, a mobile phone, etc.) for a user (e.g., an operator). In some examples, the correlation by the confirmation engine 124 uses numerical values (parameters) obtained from an acoustic signal delivered through the acoustic emitter/generator device (e.g., amplitude difference, travel time, etc.). The signal sent at different output settings of frequency and/or dB—can provide several numerical values of the response to confirm the calculation.

In some examples, the confirmation engine 124 can output the confirmation data 128 in response to receiving the density change data 122. Thus, in some instances, the confirmation engine 124 can omit a correlation technique, as disclosed herein, and provide the confirmation data 128 indicating that the density change has been detected in the pipeline. In some examples, the confirmation engine 124 can determine that the density change for the fluid (e.g., at the pipeline in the pipeline network) exceeds the density change threshold or is outside a density allowable fluctuation range. The confirmation engine 124 can evaluate the flowrate for the fluid (e.g., as specified by the process variable data 126) to determine whether the flowrate exceeds a flowrate threshold or is outside a flowrate range for the fluid in response to determining that the fluid exceeds the density change threshold or is outside the density allowable fluctuation range. The confirmation engine 124 can output the confirmation data 128 in response to determining that the flowrate exceeds the flowrate threshold or is outside the flowrate range for the fluid.

In some examples, the confirmation engine 124 can evaluate a flowrate of the multiphase fluid relative to a multiphase flowrate threshold or multiphase flowrate range, for example, in response to determining that the density change for the multiphase fluid phase exceeds the density allowable fluctuation threshold or is outside the density allowable fluctuation range, or the flowrate exceeds the flowrate threshold or is outside the flowrate range for the given fluid phase. The flowrate of the multiphase fluid can be provided as a part of the process variable data 126, in some instances. The confirmation engine 124 can output the confirmation data 128 in response to determining that the flowrate of the multiphase fluid exceeds the multiphase flowrate threshold or is outside the multiphase flowrate range for the multiphase fluid.

In some examples, the acoustic surveillance system 100 can include a process controller 132 that can be used to adjust or cause the one or more process variables to be adjusted to compensate for the density change of the fluid. In some examples, the process controller 132 can adjust the process variables in response to receiving an indication from the confirmation engine 124. The confirmation engine 124 can be provide the indication, for example, in response to confirming that the correlation exists, determining that the density change of the fluid, the flowrate of the fluid and/or the flowrate of the multiphase fluid exceeds a given threshold or is outside a given range, as disclosed herein. The process controller 132 can adjust or cause the one or more process variables to be adjusted to manipulate (or change) the flowrate of the fluid (or one or more phase of multiphase fluid) to balance conditions in the pipeline, or counteract the density change of the fluid. Thus, in some examples, the acoustic surveillance system 100 can detect undesired fluid production that can exceed facilities design limits and mitigate dangers such elevated fluid productions by adjusting or causing the one or more process variable parameters to be adjusted.

In some examples, the process controller 132 can output process parameter control data 134 in response to receiving the indication from the confirmation engine 124. In some examples, the process controller 132 can receive an indication from the confirmation engine 124 that the density change is not caused by one the temperature and/or pressure. In some examples, the process controller 132 can generate the process parameter control data 134 based on the density change data 122. The process parameter control data 134 can include instructions for adjusting the one or more process variables to optimize the pipeline network performance of the pipeline network. In some examples, the process parameter control data 134 can include new (or updated) values for the one or more process variables. For example, the process parameter control data 134 can indicate a new flowrate for a given fluid phase. Thus, in some instances, the process controller 132 can cause the flowrate of the given fluid phase (e.g., gas) to be adjusted to impact an overall mixture density of the multiphase fluid to avoid a potentially hazardous condition. As such, excess production of undesired fluid from the source can be captured (detected) and surface production controls can be adjusted to mitigate or eliminate the excess produced undesired fluid.

By way of further example, the process controller 132 can output process parameter control data 134 identifying or indicating a fluid flowrate for the given fluid phase, and provide this rate to a flow control valve (for the given fluid phase) or cause this rate to be used to adjust (or set) the flow control valve so that the given fluid phase flows at the fluid flowrate. In instances in which the temperature increases in the pipeline, the process parameter control data 134 can specify a lower flowrate for the given fluid phase to counteract the temperature increase in the pipeline. In some examples, the process controller 132 can provide the process parameter control data 134 on the output device 130 for the user, and the user can manually adjust the one or more process variables.

In some examples, the density calculator 120 can process the acoustic wave data 112 to extract (or determine) sound properties (e.g., frequency, wavelength, amplitude, and/or cycle) from one or more acoustic signals for user analysis, which can be provided as acoustic wave property data 136. The acoustic wave property data 136 can be rendered on the output device 130 for the user. In some examples, the user can evaluate the extracted sound properties to determine whether the density change has occurred in the fluid. If the user determines that the density change has occurred in the fluid, this can be indicative that there has been a change in one of the pressure, temperature, and/or flowrate of one or more fluid phases of the fluid. The user can evaluate the determined density change relative to the density allowable fluctuation range or density allowable fluctuation threshold and if the density change is outside the density allowable fluctuation range or exceeds the density allowable fluctuation threshold this can be indicative that one or more process variables has changed. In some examples, the user can use the determined density change to draw a conclusion that it is likely that one or more process variables have changed. In some examples, the user can adjust the one or more process variables (e.g., the pressure, the temperature, and/or flowrate) through surface production control means available at the source to compensate for the density change and thus ensure that the production pipeline is operating within safe limits.

In some examples, as disclosed herein, the acoustic wave data 112 can be processed to detect potential pipeline corrosion and/or erosion. For example, the acoustic wave analyzer 102 can include a pipeline degradation detector 138 that can evaluate the acoustic wave data 112 for an abnormal acoustic signature. For example, the pipeline degradation detector 138 can determine an acoustic signature of the propagated sound wave (based on the acoustic wave data 112) and evaluate the determined acoustic signature to determine whether it is abnormal. For example, the pipeline degradation detector 138 can evaluate the acoustic signature to determine whether any characteristics (or features) of the acoustic signature exhibit a repetitive behavior over time. The detection of the repetitive behavior of the features of the acoustic signature can indicate that the acoustic signature is abnormal. The determination that the acoustic signature is abnormal can be indicative of a potential pipeline corrosion and/or erosion of the pipeline network (e.g., of a respective pipeline). The pipeline degradation detector 138 can output degradation data 140 indicating that there may be corrosion and/or erosion of the pipeline. The degradation data 140 can be rendered on the output device 130 for the user. In some examples, the flow of fluid can be halted through the pipeline in response to detecting a potential degradation in the pipeline. For example, the pipeline degradation detector 138 can cause the fluid to be halted from flowing the pipeline, and thus permit the user to inspect the pipeline for corrosion and/or erosion.

In further examples, the acoustic wave analyzer 102 can evaluate the acoustic wave data 112 to detect (premature) water production or free gas production. For example, the acoustic wave analyzer 102 can detect water breakthroughs in oil producers, increase of gas production in oil producers, or both. This particular advantage can be beneficial to oil producers. When initial surveillance is initiated post drilling or workover rig operations, a user (e.g., an engineer) will have the production flowback data prior to the device first on stream surveillance date, in which, the user can be aware the well is producing 100% oil with normal Gas-to-Oil-Ratio. An acoustic device (sensor), installed in an upper completion of a well, can begin logging acoustic wave data. Water breakthrough can be detected by the acoustic wave analyzer 102 through analyzing heavier density acoustic signature to an original well production performance previously. For example, the acoustic wave analyzer 102 can analyze two separate sets of signatures where one will be through the acoustic signal and the other signature captured through wellhead decrease, wellhead temperature increase, in addition to flowrate measurements. The other attributes to confirm water production breakthrough is through declining flowing wellhead pressure and increasing flowing wellhead temperature at fixed choke setting. Gas breakthrough can be detected by the acoustic wave analyzer 102 through combining a lighter density acoustic signature to the original well production performance previously (the production flowback data). The other attribute to confirm the gas breakthrough is increase in flowing wellhead pressure at fixed choke setting. Furthermore, the device can be operated during the flowback operations while the rig is on location to create the baseline of the well performance once the well has achieved successful clean up results after flowback parameters demonstrate 100% oil production with 0% Water Cut and associated Gas-to-Oil-Ratio. Accordingly, the acoustic wave analyzer 102 in some instances can use the acoustic wave data 112 and the production flowback data to identify and detect abnormalities of denser or lighter fluids or gases introduced into a mixture baseline reference.

In some examples, the acoustic wave analyzer 102 can evaluate the acoustic wave data 112 to detect a pipeline pinhole leaks or ruptures. Pipeline rupture/pinhole leak during flow will result in high temperature response due to friction through the small rupture or deterioration in pipeline wall thickness. This friction between the metal and fluid flow can result in high acoustic waves generation that can be reflected in the acoustic wave data 112. The attributes associated with this event can be high frequency, short wavelengths, high amplitudes, short time periods, and for continuous duration until the rupture is contained. The acoustic wave analyzer 102 can evaluate the acoustic wave data 112 to determine whether an acoustic signal exhibits (or has) the attributes (or a subset thereof) over a period of time. The acoustic wave analyzer 102 can detect the pipeline pinhole leak or rupture in response to detecting the attributes (or some subset thereof) in the acoustic signal. The acoustic wave analyzer 102 can output on the output device 130 an indication that a potential pipeline pinhole leak or rupture has been detected in the pipeline network (or the pipeline of the pipeline network).

In some examples, the acoustic wave analyzer 102 can evaluate the acoustic wave data 112 to detect a pipeline pinhole leaks or ruptures. Pipeline rupture/pinhole leak during flow will result in high temperature response due to friction through the small rupture or deterioration in pipeline wall thickness. This friction between the metal and fluid flow can result in high acoustic waves generation that can be reflected in the acoustic wave data 112. The attributes associated with this event can be high frequency, short wavelengths, high amplitudes, short time periods, and for continuous duration until the rupture is contained. The acoustic wave analyzer 102 can evaluate the acoustic wave data 112 to determine whether an acoustic signal exhibits (or has) the attributes (or a subset thereof) over a period of time. The acoustic wave analyzer 102 can detect the pipeline pinhole leak or rupture in response to detecting the attributes (or some subset thereof) in the acoustic signal. The acoustic wave analyzer 102 can output on the output device 130 an indication that a potential pipeline pinhole leak or rupture has been detected in the pipeline network (or the pipeline of the pipeline network)

In some examples, the detected density change can be used to identify a source or cause of the density change in the fluid. Thus, in some instances, the system 100 can be used for tracing back to flowrate source (e.g., back to a hydrocarbon producing well). For example, a number of acoustic monitoring systems (such as the acoustic monitoring system 114) can be placed along the pipeline network. A pipeline network (or pipeline networks) is often connected in a sequential pattern. Depending on a location of the detected signal of density change, it can be traced back to the source through similar signals captured by acoustic monitoring systems at other locations in the pipeline network backwards to the source. Thus, in some instances, the density calculator 120 can receive acoustic wave data from a number of acoustic monitoring systems configured to monitor the pipeline network(s). The density calculator 120 can provide respective density change data, which can be received by the process controller 132. The process controller 132 can receive acoustic monitoring identification data identifying a location of and/or each acoustic monitoring system (or acoustic sensor/detector, for example, as disclosed herein) and information identifying the acoustic monitoring system.

In some examples, the acoustic wave data provided by a corresponding acoustic monitoring system (or acoustic sensor/detector) can include acoustic monitoring identification data. The respective density change data provided by the density calculator 120 can include the acoustic monitoring identification data (e.g., extracted from respective acoustic wave data by the density calculator 120 used for generating the density change data). The process controller 132 can process the density change data and the acoustic monitoring identification data to identify acoustic monitoring systems (or acoustic sensor/detectors) that provided acoustic wave data from which the corresponding density change was detected. Thus, the process controller 132 can identify acoustic monitoring systems (or acoustic sensor/detectors) that provided acoustic wave data from which the density change was detected. The identified acoustic systems (or acoustic sensor/detectors) can be used as a trace or path back to the source.

Figure 2:
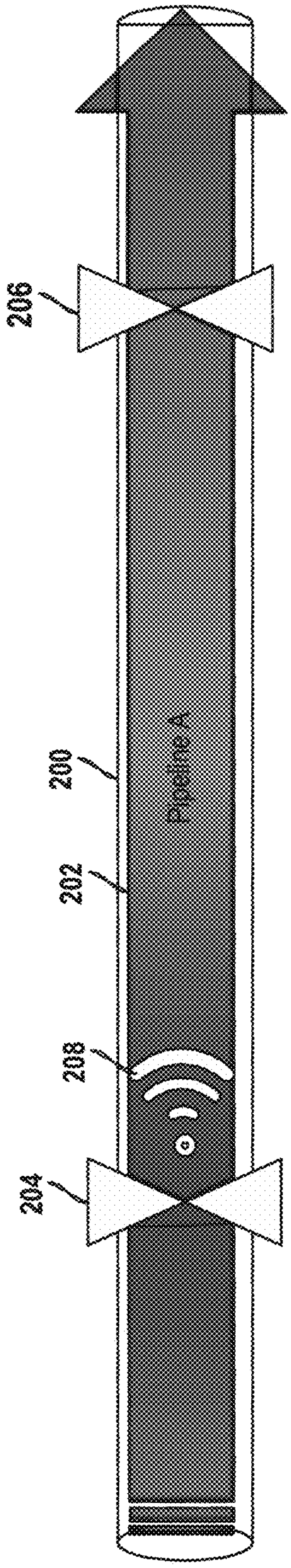
FIG. 2 is an example of a production pipeline of a production pipeline network with a multiphase fluid.

FIG. 2 is an example of a pipeline 200 of a pipeline network through which a multiphase fluid 202 is flowing. In some examples, the pipeline 200 is located at a processing facility network. The pipeline 200 is identified as "Pipeline A" and the multiphase fluid 202 is represented as an arrow in the example of FIG. 2. An acoustic source generator (or signal source) 204 can be located at a location within the pipeline 200, while an acoustic wave sensor 206 can be located downstream from the acoustic source generator 204 in the pipeline 200. In some examples, the acoustic source generator 204 and the acoustic wave sensor 206 are high-pressure and/or high-temperature compatible sensors (or devices). The acoustic source generator 204 and the acoustic wave sensor 206 can form an acoustic monitoring system, such as the acoustic monitoring system 114, as shown in FIG. 1. Thus, reference can be made to one or more examples of FIG. 1 in the example of FIG. 2. The acoustic source generator 204 can emit an acoustic wave (a sound wave) that can propagate through the multiphase fluid 202. As the sound wave propagates through the multiphase fluid 202, characteristics of the sound wave can change because of the properties of one or more phases of the multiphase fluid 202. A propagated sound wave can be captured by the acoustic wave sensor 206 and processed to provide the acoustic wave data 112, as shown in FIG. 1, in some instances. In some examples, the acoustic wave data 112 can be transmitted over a network, such as disclosed herein, to a surveillance system, such as the acoustic surveillance system 100, as shown in FIG. 1 for processing and/or evaluation according to one or more examples, as disclosed herein. The acoustic wave sensor can also provide a surveillance advantage in the case of acoustic signal source failure. This can be through changing the acoustic wave sensor to become a microphone and capture the sound of the flowrate instead of capturing the acoustic signal source. The data collected can be similar to the data collected of the acoustic signal source. This can provide reliability and redundancy of data for analysis and comparison.

Figure 3:
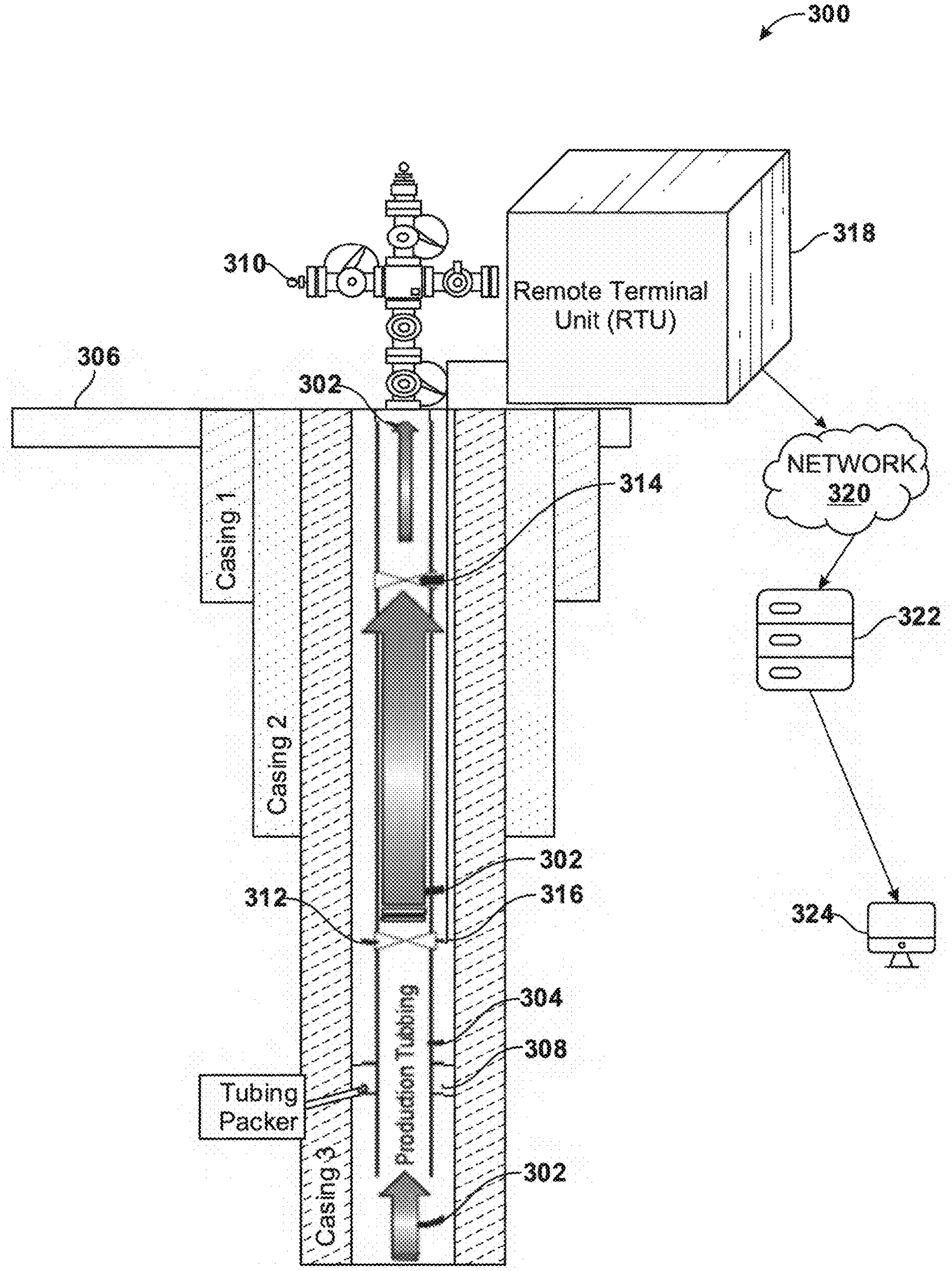
FIG. 3 is an example of a simplified well that can be used for extracting a multiphase fluid from a ground.

FIG. 3 is an example of a simplified well 300 that can be used for extracting a multiphase fluid 302 from a ground, or reservoir. For clarity and brevity purposes, not all components of the well 300 are shown in the example of FIG. 3. In some examples, the multiphase fluid 302 can correspond to the multiphase fluid 202, as shown in FIG. 2. Thus, reference can be made to one or more examples of FIGS. 1-2 in the example of FIG. 3. A number of different instances of the multiphase fluid 302 to illustrate fluid flow through a production tubing 304. The well 300 includes a number of casings, which are identified as "Casing 1," "Casing 2," and "Casing 3" in the example of FIG. 3. The production tubing 304 can be inserted or located inside the casings (e.g., Casing 3) for transporting the multiphase fluid 302 from a wellbore perforated in a subterranean hydrocarbon bearing reservoir formation to a surface production pipeline 306. In some examples, the well 300 is equipped with a tubing packer 308 for sealing off an annular spacing between a casing (e.g., Casing 3) and the production tubing 304. A wellhead 310 is located at top of the surface 306 and can be coupled (in fluid communication) with the production tubing 304, as shown in FIG. 3. The wellhead 310 can control a flow of fluids (e.g., the multiphase fluid 302) from the well 300. The wellhead 310 can be made of a series of valves and fittings that can connect the casing (e.g., Casing 3) and the production tubing 304 to surface equipment (not shown in FIG. 3, for clarity and brevity purposes).

In the example of FIG. 3, the well 300 can be equipped with an acoustic monitoring system, such as the acoustic monitoring system 114, as shown in FIG. 1. Thus, the production tubing 304 can be equipped with an acoustic source generator 312 and an acoustic wave sensor 314, as shown in FIG. 3. The acoustic source generator 312 and the acoustic wave sensor 314 can be implemented in some instances similar to the acoustic source generator 204 and the acoustic wave sensor 206, as shown in FIG. 2. The acoustic source generator 312 and the acoustic wave sensor 314 can be coupled through one or more respective communication mediums (e.g., wires) 316 to a remote terminal unit (RTU) 318. The acoustic source generator 312 and the acoustic wave sensor 314 can provide data, which can be received by the RTU 318. The data can be transmitted (e.g., wirelessly or over a wired channel/medium) via a network 320 (e.g., wired and/or wireless, including private and/or public networks, and/or cellular networks) to a surveillance system 322. The data in some instances can include or correspond to the acoustic wave data 112, as shown in FIG. 1. The surveillance system 322 can be implemented similar to (or include) the acoustic surveillance system 100, as shown in FIG. 1.

The surveillance system 322 can process the data according to one or more examples herein, and results of the processing can be rendered on a display 324, as shown in FIG. 3. In some examples, the display 324 corresponds to the output device 130, as shown in FIG. 1. The surveillance system 322 can be used for remote monitoring (e.g., surveillance) of a fluid process, which can include production and/or transportation of the fluid, in some instances. The fluid process can be adjusted (or optimized) according to one or more examples, as disclosed herein. The acoustic wave sensor can also provide a surveillance advantage in the case of acoustic signal source failure. This can be through changing the acoustic wave sensor to become a microphone and capture the sound of the flowrate instead of capturing the acoustic signal source. The data collected can be similar to the data collected of the acoustic signal source. This can provide reliability and redundancy of data for analysis and comparison. Moreover, the surveillance can capture the well flowrate recorded sound file through time and archived in a server to determine flowrate changes (either an increase or decrease in volumetric flowrate or changes in fluid composition through introduction of water or excessive gas).

Figure 4:
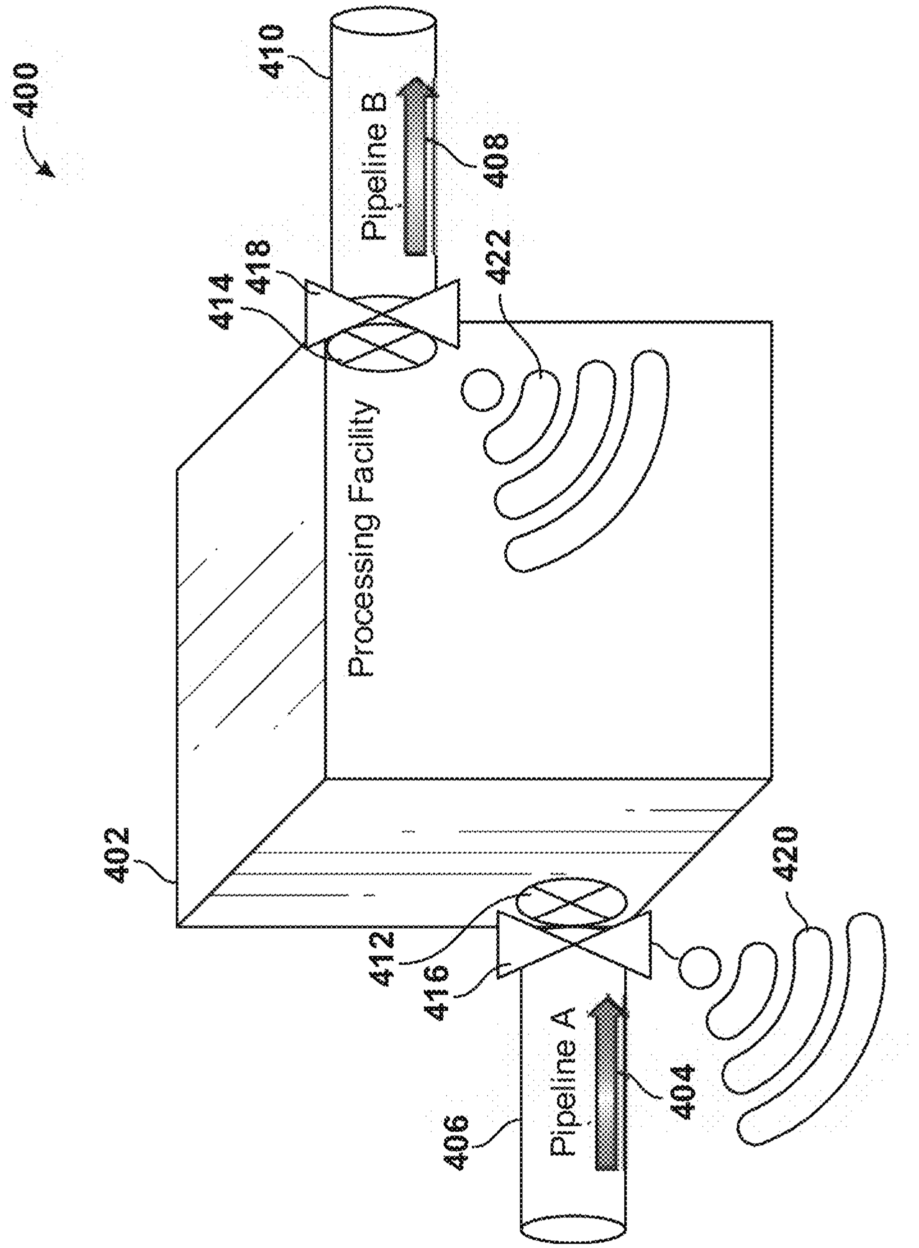
FIG. 4 is an example of a simplified pipeline network through a processing facility for processing a multiphase fluid.

FIG. 4 is an example of a simplified pipeline network 400 through a processing facility 402 (identified as "Processing Facility") for processing a multiphase fluid 404. In some examples, the multiphase fluid 404 can correspond to the multiphase fluid 202, as shown in FIG. 3, or the multiphase fluid 302, as shown in FIG. 3. Thus, reference can be made to one or more examples of FIGS. 1-3 in the example of FIG. 1. The multiphase fluid 404 can be provided via a first pipeline 406 (identified as "Pipeline A") to the processing facility 402. In some examples, the first pipeline 406 corresponds to the pipeline 200, as shown in FIG. 2. In some examples, the multiphase fluid 404 is provided upstream from a well, such as the well 300, as shown in FIG. 3. In some examples, the multiphase fluid 404 includes two phases, for example, liquid phase (e.g., oil and water) and gas phase. The multiphase fluid 404 can be processed by the processing facility 402 to separate one of the phases to provide a multiphase fluid 408, as shown in FIG. 4. The processing facility 402 can provide the multiphase fluid 408 in a second pipeline 410 (identified as "Pipeline B") in the example of FIG. 4. It is understood that any number of pipelines can be present in the pipeline network 400 in accordance with the present disclosure.

In some examples, the pipeline 406 is coupled (in fluid communication) to the processing facility through an inlet 412 to receive the multiphase fluid 404 and the pipeline 410 is coupled to the processing facility through an outlet 414 to receive the multiphase fluid 408. In some examples, a first acoustic wave sensor 416 is positioned in the inlet 412 and a second acoustic wave sensor 418 can be positioned in the outlet 414. The first and second acoustic wave sensors 416-418 can be used to capture one or more acoustic waves generated by acoustic wave generators (as disclosed herein), and which have propagated through one of the multiphase fluids 404 and 408. In some examples, the first and second acoustic wave sensors 416-418 can be implemented similar to the acoustic wave sensor 206, as shown in FIG. 2, or the acoustic wave sensor 314, as shown in FIG. 3. Each of the first and second acoustic wave sensors 416-418 can be equipped for wired and/or wireless communication (shown at 420-422, respectively) of data (characterizing propagated acoustic waves) to an acoustic surveillance system, such as the acoustic surveillance system 100, as shown in FIG. 1. The acoustic surveillance system 100 can receive the data as the acoustic wave data 112, as shown FIG. 1, and process/evaluate the data according to one or more examples, as disclosed herein.

FIG. 5 is an example of a table 500 of acoustic wave responses in different density mediums. The table 500 includes a first column identifying characteristics of a sound wave, such as a speed, frequency, wavelength, amplitude, cycle (period), and a travel time. Second and third columns identify different attributes (e.g., fast, slow, high, low, short, and long, as shown FIG. 5) for the characteristics of the sound wave. The table 500 can be used for configuring parameters of the acoustic wave analyzer 102, as shown in FIG. 1. Thus, reference can be made to one or more examples of FIGS. 1-5 in the example of FIG. 6.

Figure 6:
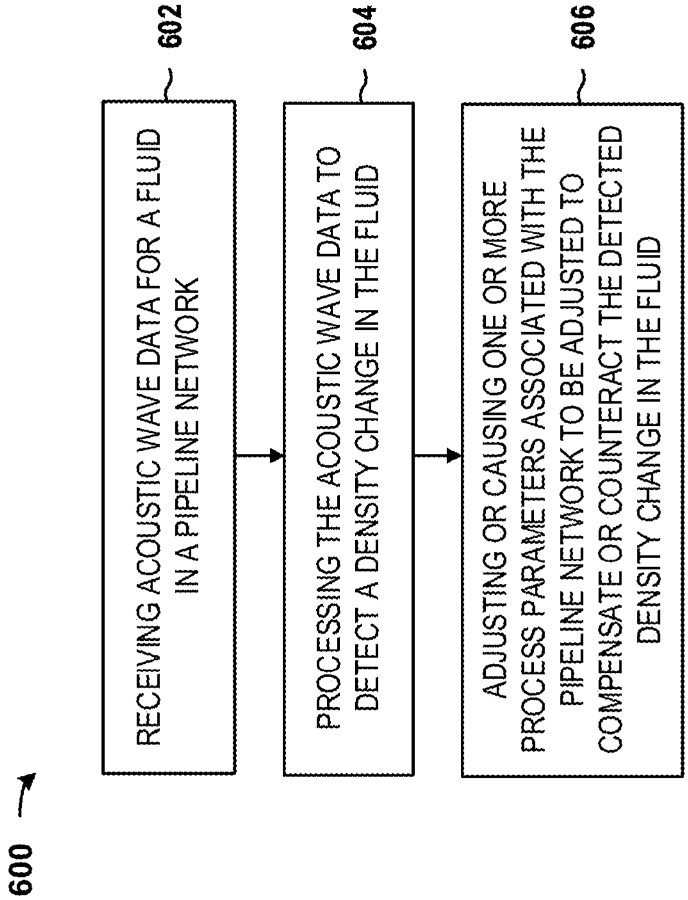
FIG. 6 is an example of a method 600 for detecting a density change in a fluid in a pipeline network and process parameter control based on the detected density fluid change.

In view of the foregoing structural and functional features described above, an example method will be better appreciated with reference to FIG. 6. While, for purposes of simplicity of explanation, the example method of FIG. 6 is shown and described as executing serially, it is to be understood and appreciated that the present example is not limited by the illustrated order, as some actions could in other examples occur in different orders, multiple times and/or concurrently from that shown and described herein. Moreover, it is not necessary that all described actions be performed to implement the method.

FIG. 6 is an example of a method 600 for detecting a density change in a fluid in a pipeline network and process parameter control based on the detected density fluid change. In some examples, the acoustic wave analyzer 102, as shown in FIG. 1 can implement the method 600. Thus, reference can be made to one or more examples of FIGS. 1-5 in the example of FIG. 6. The method 600 can begin at 602 by receiving acoustic wave data (e.g., the acoustic wave data 112, as shown in FIG. 1) characterize one or more propagated acoustic waves through the fluid. In some examples, the fluid is a multiphase fluid, such as the multiphase fluid 202, as shown in FIG. 2, the multiphase fluid 302, as shown in FIG. 3, or the multiphase fluid 404 or 408, as shown in FIG. 4. At 604, the acoustic wave data can be evaluated (e.g., by the density calculator 120) to detect a density change in the fluid. At 608, one or more process parameters associated with the pipeline network can be adjusted or caused to be adjusted (e.g., by the process controller 132, as shown in FIG. 1) to compensate or counteract the detected density change in the fluid.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system 700 of FIG. 7. Thus, reference can be made to one or more examples of FIGS. 1-6 in the example of FIG. 7.

Figure 7:
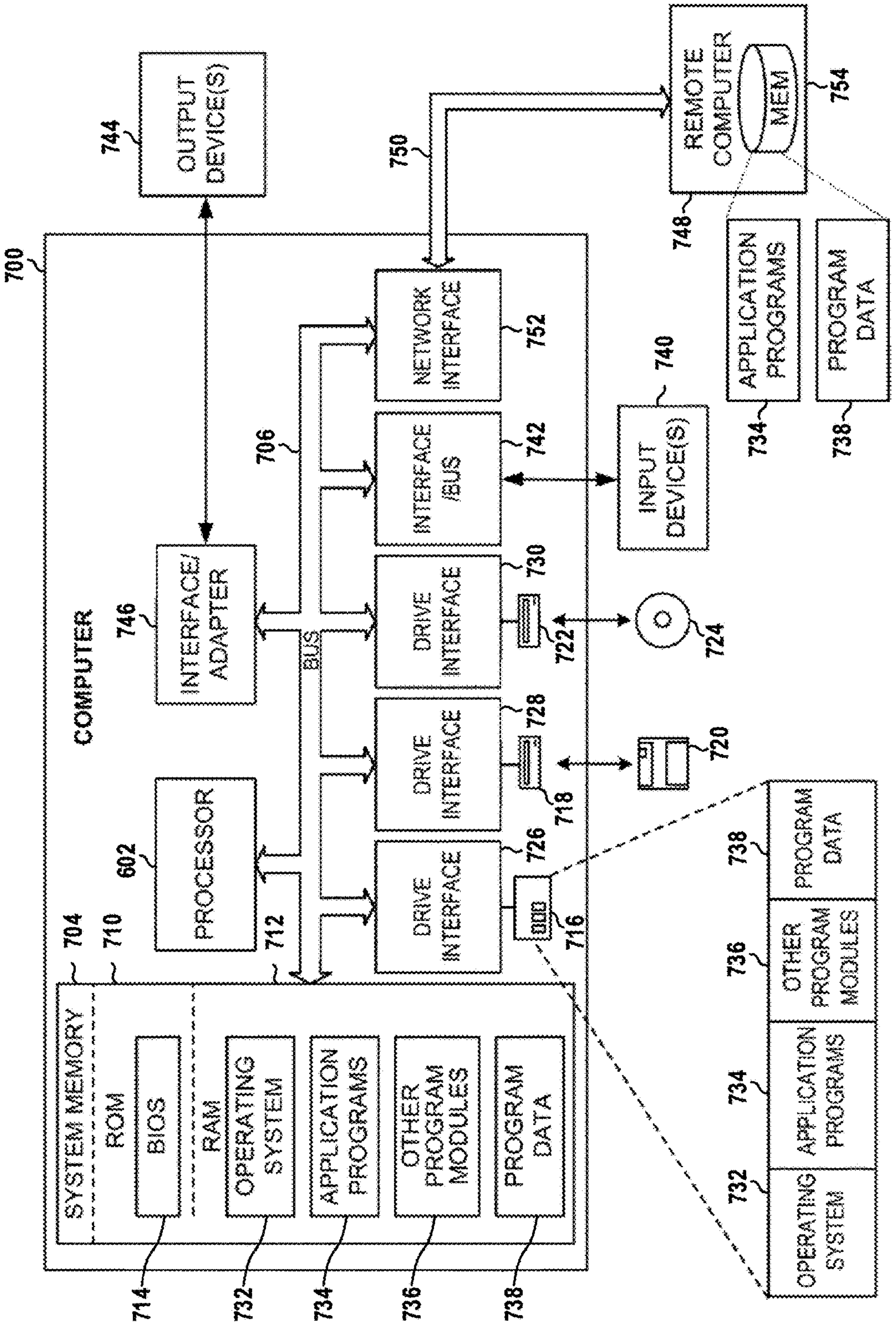
FIG. 7 depicts an example computing environment that can be used to perform one or more actions according to an aspect of the present disclosure.

In this regard, FIG. 7 illustrates one example of a computer system 700 that can be employed to execute one or more embodiments of the present disclosure. Computer system 700 can be implemented on one or more general purpose networked computer systems, embedded computer systems, routers, switches, server devices, client devices, various intermediate devices/nodes or standalone computer systems. Additionally, computer system 700 can be implemented on various mobile clients such as, for example, a personal digital assistant (PDA), laptop computer, pager, and the like, provided it includes sufficient processing capabilities.

Computer system 700 includes processing unit 702, system memory 704, and system bus 706 that couples various system components, including the system memory 704, to processing unit 702. Dual microprocessors and other multiprocessor architectures also can be used as processing unit 702. System bus 706 may be any of several types of bus structure including a memory bus or memory controller, a peripheral bus, and a local bus using any of a variety of bus architectures. System memory 604 includes read only memory (ROM) 710 and random access memory (RAM) 712. A basic input/output system (BIOS) 714 can reside in ROM 710 containing the basic routines that help to transfer information among elements within computer system 700.

Computer system 700 can include a hard disk drive 716, magnetic disk drive 718, e.g., to read from or write to removable disk 720, and an optical disk drive 722, e.g., for reading CD-ROM disk 724 or to read from or write to other optical media. Hard disk drive 716, magnetic disk drive 718, and optical disk drive 722 are connected to system bus 706 by a hard disk drive interface 726, a magnetic disk drive interface 728, and an optical drive interface 730, respectively. The drives and associated computer-readable media provide nonvolatile storage of data, data structures, and computer-executable instructions for computer system 700. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and disclosed herein. A number of program modules may be stored in drives and RAM 710, including operating system 732, one or more application programs 734, other program modules 736, and program data 738. In some examples, the application programs 734 can include one or more modules (or block diagrams), or systems, as shown and disclosed herein.

A user may enter commands and information into computer system 700 through one or more input devices 740, such as a pointing device (e.g., a mouse, touch screen), keyboard, microphone, joystick, game pad, scanner, and the like. These and other input devices are often connected to processing unit 702 through a corresponding port interface 742 that is coupled to the system bus, but may be connected by other interfaces, such as a parallel port, serial port, or universal serial bus (USB). One or more output devices 744 (e.g., display, a monitor, printer, projector, or other type of displaying device) is also connected to system bus 706 via interface 746, such as a video adapter.

Computer system 700 may operate in a networked environment using logical connections to one or more remote computers, such as remote computer 748. Remote computer 748 may be a workstation, computer system, router, peer device, or other common network node, and typically includes many or all the elements described relative to computer system 700. The logical connections, schematically indicated at 750, can include a local area network (LAN) and a wide area network (WAN). When used in a LAN networking environment, computer system 700 can be connected to the local network through a network interface or adapter 752. When used in a WAN networking environment, computer system 700 can include a modem, or can be connected to a communications server on the LAN. The modem, which may be internal or external, can be connected to system bus 706 via an appropriate port interface. In a networked environment, application programs 734 or program data 738 depicted relative to computer system 700, or portions thereof, may be stored in a remote memory storage device 754.

Although this disclosure includes a detailed description on a computing platform and/or computer, implementation of the teachings recited herein are not limited to only such computing platforms. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models (e.g., software as a service (Saas, platform as a service (PaaS), and/or infrastructure as a service (IaaS)) and at least four deployment models (e.g., private cloud, community cloud, public cloud, and/or hybrid cloud). A cloud computing environment can be service oriented with a focus on statelessness, low coupling, modularity, and semantic interoperability.

Figure 8:
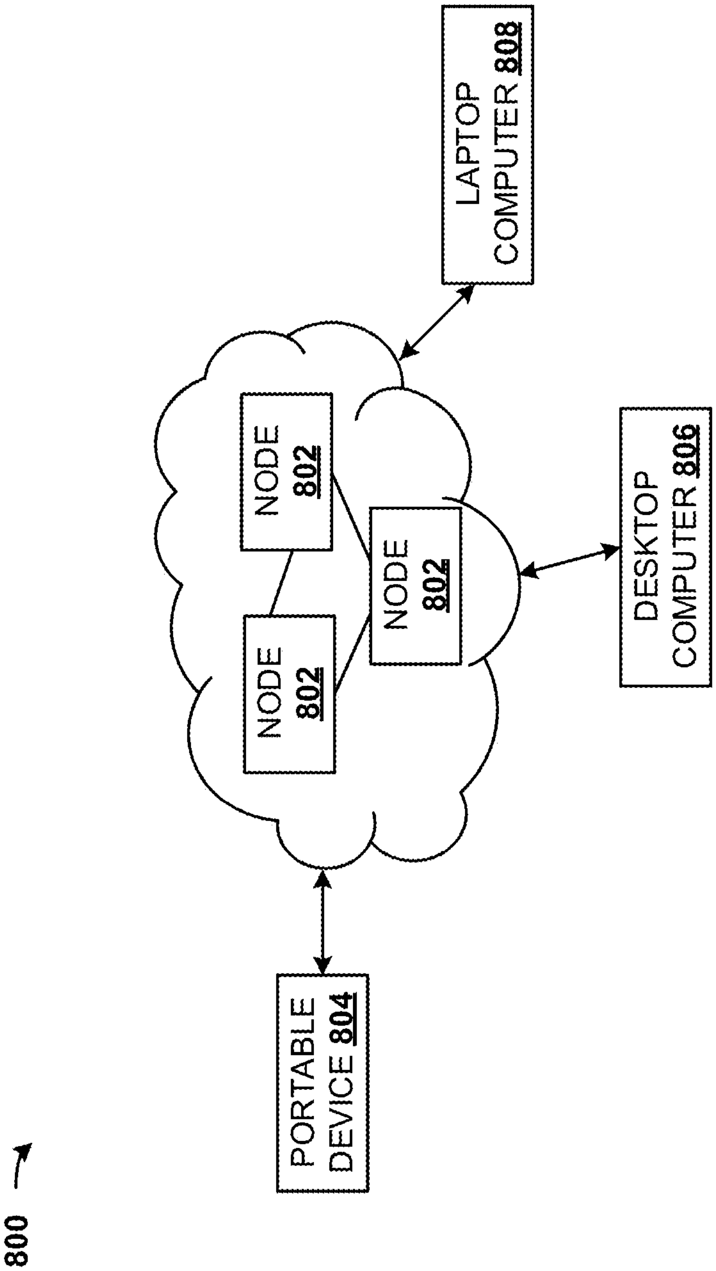
FIG. 8 depicts a cloud computing environment that can be used to perform one or more actions according to an aspect of the present disclosure.

FIG. 8 is an example of a cloud computing environment 800 that can be used for implementing one or more modules and/or systems in accordance with one or more examples, as disclosed herein. Thus, reference can be made to one or more examples of FIGS. 1-7 in the example of FIG. 8. As shown, cloud computing environment 800 can include one or more cloud computing nodes 802 with which local computing devices used by cloud consumers (or users), such as, for example, personal digital assistant (PDA), cellular, or portable device 804, a desktop computer 806, and/or a laptop computer 808, may communicate. The computing nodes 802 can communicate with one another. In some examples, the computing nodes 802 can be grouped (not shown) physically or virtually, in one or more networks, such as Private, Community, Public, or Hybrid clouds, or a combination thereof. This allows the cloud computing environment 800 to offer infrastructure, platforms and/or software as services for which a cloud consumer does not need to maintain resources on a local computing device. The devices 804-808 are intended to be illustrative and that computing nodes 802 and cloud computing environment 800 can communicate with any type of computerized device over any type of network and/or network addressable connection (e.g., using a web browser). In some examples, the one or more computing nodes 802 are used for implementing one or more examples disclosed herein for processing and computing data. Thus, in some examples, the one or more computing nodes can be used to implement modules, platforms, and/or systems, as disclosed herein.

In some examples, the cloud computing environment 800 can provide one or more functional abstraction layers. It is understood that the cloud computing environment 800 need not provide all of the one or more functional abstraction layers (and corresponding functions and/or components), as disclosed herein. For example, the cloud computing environment 800 can provide a hardware and software layer that can include hardware and software components. Examples of hardware components include: mainframes; RISC (Reduced Instruction Set Computer) architecture based servers; servers; blade servers; storage devices; and networks and networking components. In some embodiments, software components include network application server software and database software.

In some examples, the cloud computing environment 800 can provide a virtualization layer that provides an abstraction layer from which the following examples of virtual entities may be provided: virtual servers; virtual storage; virtual networks, including virtual private networks; virtual applications and operating systems; and virtual clients. In some examples, the cloud computing environment 800 can provide a management layer that can provide the functions described below. For example, the management layer can provide resource provisioning that can provide dynamic procurement of computing resources and other resources that are utilized to perform tasks within the cloud computing environment. The management layer can also provide metering and pricing to provide cost tracking as resources are utilized within the cloud computing environment 800, and billing or invoicing for consumption of these resources. In one example, these resources may include application software licenses. Security provides identity verification for cloud consumers and tasks, as well as protection for data and other resources. The management layer can also provide a user portal that provides access to the cloud computing environment 800 for consumers and system administrators. The management layer can also provide service level management, which can provide cloud computing resource allocation and management such that required service levels are met. Service Level Agreement (SLA) planning and fulfillment can also be provided to provide pre-arrangement for, and procurement of, cloud computing resources for which a future requirement is anticipated in accordance with an SLA.

In some examples, the cloud computing environment 800 can provide a workloads layer that provides examples of functionality for which the cloud computing environment 800 may be utilized. Examples of workloads and functions which may be provided from this layer include: mapping and navigation; software development and lifecycle management; virtual classroom education delivery; data analytics processing; and transaction processing. Various embodiments of the present disclosure can utilize the cloud computing environment 800.

Figure 9:
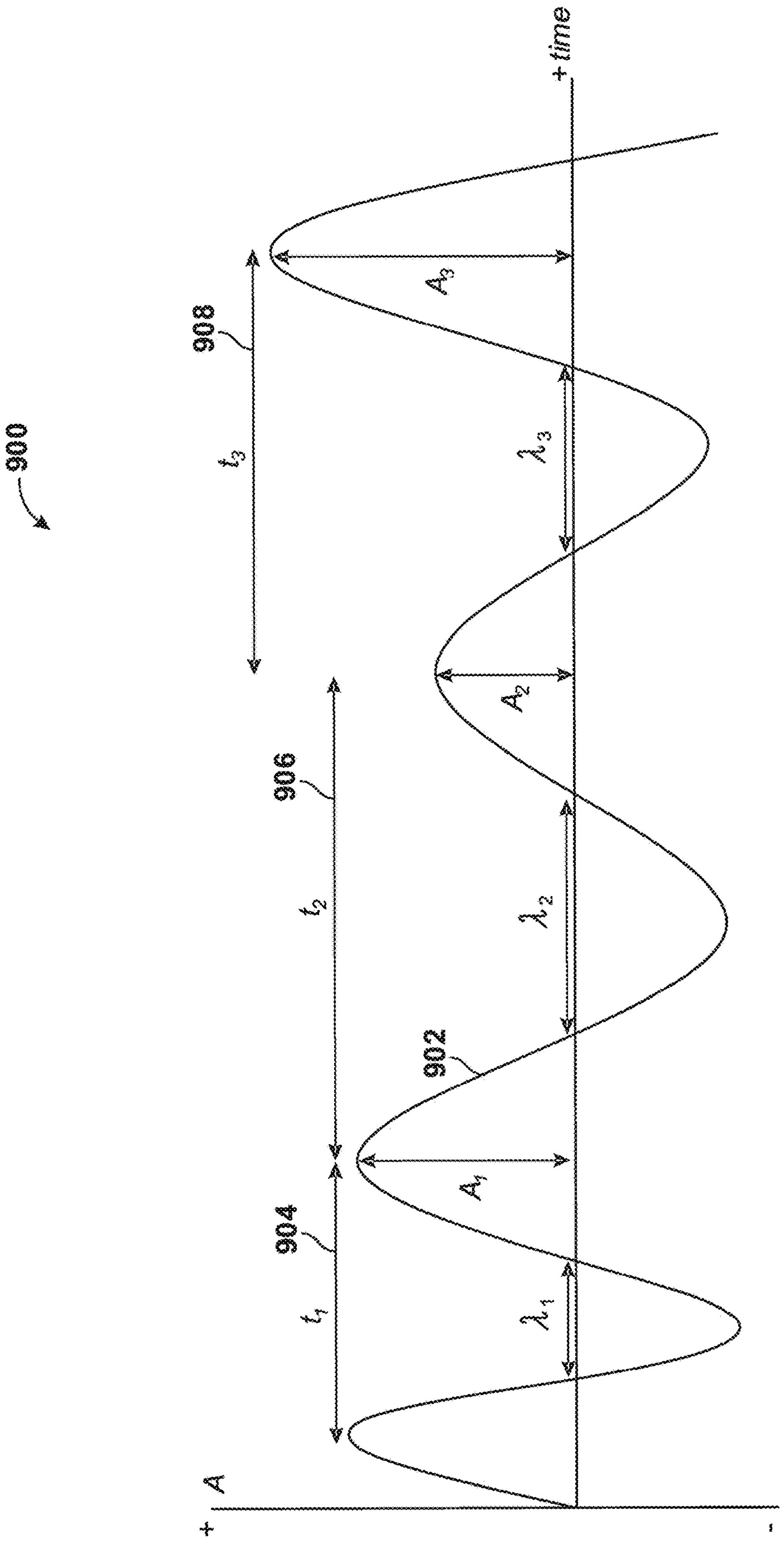
FIG. 9 is an example of an acoustic signal plot.

FIG. 9 is an example of an acoustic signal plot 900. The acoustic signal plot 900 includes an electronic representation of an acoustic wave that has been propagated through a fluid (e.g., a single or multiphase fluid) and captured by an acoustic sensor, which can be referred to as an acoustic signal 902. The acoustic signal 902 can be provided as or as part of the acoustic wave data 112, as shown in FIG. 1. For example, the acoustic signal 902 can be provided by an acoustic sensor, as disclosed herein. Thus, reference can be made to one or more examples of FIGS. 1-8 in the example of FIG. 9. For example, the acoustic wave analyzer 102 can evaluate the acoustic signal 902 to detect a density change in the fluid. In the example of FIG. 9, the acoustic signal 902 is plotted over a period of time. The acoustic signal plot 900 includes an x-axis (representing time), and a y-axis (representing an amplitude (identified as "A") of the acoustic signal 902). The amplitude of the acoustic signal 902 can represent a magnitude or strength of air pressure variations caused by the acoustic wave.

For example, the density calculator 120 can evaluate the acoustic signal 902 to identify peaks (or amplitudes) of the acoustic signal 902. The density calculator 120 can identify peaks to determine a period of the acoustic signal 902. The acoustic signal 902 can have a period that varies over time corresponding to a varying cycle (or cycle length). Because the acoustic signal 902 has a period that varies over time, a frequency of the acoustic signal 902 varies as well as frequency and period are inversely related. The density calculator 120 can evaluate the acoustic signal 902 to determine a first period of time 904 of a first signal segment, a second period of time 906 of a second signal segment, and a third period of time 908 of a third signal segment of the acoustic signal 902. In the example of FIG. 9, a time length of each of the first, second, and third periods 904-908 are identified respectively as "$t_1$," "$t_2$, and "$t_3$."

The density calculator 120 can determine an amplitude of each cycle, for example, of a positive cycle of the acoustic signal 902. For example, the density calculator 120 can determine a first amplitude (identified as "$A_1$" in the example of FIG. 9), a second amplitude (identified as "$A_2$" in the example of FIG. 9), and a third amplitude (identified as "$A_3$" in the example of FIG. 9) for each corresponding first, second, and third positive cycle of the acoustic signal 902. The density calculator 120 can determine a wavelength of the acoustic signal 902 over time. With respect to the example of FIG. 9, the density calculator 120 can determine that the acoustic signal 902 has a first wavelength (identified as "$\lambda_1$" in the example of FIG. 9) over the first period of time, a second wavelength (identified as "$\lambda_2$" in the example of FIG. 9) over the second period of time, and a third wavelength (identified as "$\lambda_3$" in the example of FIG. 9) over the third period of time.

The density calculator 120 can evaluate the cycle (period of time), the wavelength, and the amplitude of each signal segment of the acoustic signal 902 over time to determine whether a density change has occurred in the fluid. For example, if the second wavelength is greater than the first wavelength, the second period of time is greater than the first period of time, and the second amplitude is less than the first amplitude, then the density calculator 120 can determine that a first density (e.g., mixture density) of the fluid over the second period of time is lighter than a second density during the first period of time. The mixture density can represent an average density of (a single or combined) fluid phase within a fluid mixture. As such, the density calculator 120 can determine that the first density of the fluid over the second period of time is less than the second density during the first period of time, which can be indicative of a density change. Because the density of the fluid over time changes from a higher density to a lower density (e.g., from the second density to the first density) this can be indicative of a decrease in density of the fluid. Alternatively, if the second density was greater than the first density this can be indicative of an increase in density of the fluid. In some examples, the density calculator 120 can provide the density change data 122 indicating a decrease in density of the fluid.

In some examples, if the third wavelength is less than the second wavelength, the third period of time is shorter than the second period time, and the third amplitude is greater than the second amplitude, then the density calculator 120 can determine that a third density of the fluid over the third period of time is heavier than first density of the fluid over the second period of time. Thus, in some instances, the mixture density can be increasing suggesting a shorter time period and wavelength as well. The density calculator 120 can determine that the third density of the fluid over the third period of time is greater than the first density during the second period of time, which can be indicative of the density change. Because the density of the fluid over time changes from a lower density to a higher density (e.g., from the first density to the third density) this can be indicative of an increase in density of the fluid. In some examples, the density calculator 120 can provide the density change data 122 indicating an increase in density of the fluid. In some examples, the density calculator 120 can provide the indication of increase or decrease in density of the fluid to the output device 130, as shown in FIG. 1. As disclosed herein, the detected density change can be used for optimizing or ensuring pipeline network performance.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached"

or "attached to" may indicate establishing either a direct or indirect connection, and is not limited to either unless expressly referenced as such. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The term "based on" means "based at least in part on." The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 5-10% of the indicated number.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

The invention claimed is:

1. A method comprising:

generating acoustic waves using an acoustic wave generator;

propagating the acoustic waves through a fluid in a hydrocarbon pipeline network;

using a processor to:

generate acoustic waves data representative of the propagated acoustic waves;

evaluate the acoustic wave data to determine a change in density of the fluid;

determine, by a confirmation engine, that a correlation exists between the change in density of the fluid and process parameters that include temperature, pressure, flowrate, and fluid phase; and adjust one or more of the process parameters of the hydrocarbon pipeline network to compensate or counteract the detected change in density of the fluid.

2. The computer implemented method of claim 1, further comprising:

evaluating, by the processor, the acoustic wave data to determine whether a production performance of a producing well has decreased; and outputting, by the processor, acoustic wave data in response to detecting the decrease in production performance.

3. The computer implemented method of claim 1, further comprising evaluating, by the processor, the acoustic wave data to detect water production or free gas production in the fluid.

4. The computer implemented method of claim 1, further comprising evaluating, by the processor, the acoustic wave data to detect abnormal fluids introduced into the hydrocarbon pipeline network.

5. The computer implemented method of claim 1, further comprising evaluating, by the processor, the acoustic wave data to detect a leak at a pipeline of the hydrocarbon pipeline network.

6. The computer implemented method of claim 1, further comprising evaluating, by the processor, the acoustic wave data to determine whether a pipeline of the hydrocarbon pipeline network has degraded.

7. The computer implemented method of claim 6, further comprising outputting, by the processor, degradation data indicating that the pipeline has degraded.

8. The computer implemented method of claim 6, further comprising causing, by the processor, fluid to be averted from flowing through the pipeline in response to determining that the pipeline has degraded based on the acoustic wave data.

9. The computer implemented method of claim 1, further comprising evaluating, by the processor, the density change data relative to process variable data characterizing a number of process parameters of hydrocarbon pipeline network to confirm whether the density of the fluid changed.

10. The computer implemented method of claim 9, further comprising generating, by the processor, confirmation data in response to confirming that the density of the fluid changed, the confirmation data identifying a density change of the fluid and/or whether the fluid increased or decreased in density.

11. The computer implemented method of claim 10, further comprising causing, by the processor, the confirmation data to be rendered on an output device.

12. A system comprising:

an acoustic monitoring system configured to propagate an acoustic wave through a fluid in a pipeline network and provide acoustic wave data characterizing the propagated acoustic wave; and an acoustic surveillance system comprising:

a confirmation engine configured to:

determine that a correlation exists between a change in density of the fluid and process parameters that include temperature, pressure, flowrate, and fluid phase;

and output confirmation data indicating the change in density is correlated to process parameters that include temperature, pressure, flowrate, and fluid phase; and a process controller, configured to cause the one or more process parameters of the pipeline network to be adjusted to compensate or counteract the detected density change in the fluid.

13. The system of claim 12, wherein the confirmation engine is coupled to a process controller configured to adjust a process parameter to compensate or counteract the detected density change in the fluid.

14. A method comprising:

receiving, by a processor, acoustic wave data representative of one or more propagated acoustic waves through a fluid in a hydrocarbon pipeline network;

evaluating, by the processor, the acoustic wave data to determine whether a production performance of a producing well has decreased;

outputting, by the processor, acoustic wave data in response to detecting a decline in well performance;

confirming, by a confirmation engine that a correlation exists between a change in density of the fluid and process parameters that include temperature, pressure, flowrate, and fluid phase; and adjusting, by a process controller, a process parameter to compensate or counteract the detected change in density of the fluid.

* * * * *